United States Patent
Roper

(10) Patent No.: US 12,231,813 B1
(45) Date of Patent: *Feb. 18, 2025

(54) BRIDGING VIDEO CONFERENCE CONNECTIONS

(71) Applicant: Zoom Video Communications, Inc., San Jose, CA (US)

(72) Inventor: Brandon Roper, Washington, UT (US)

(73) Assignee: Zoom Video Communications, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/376,015

(22) Filed: Oct. 3, 2023

Related U.S. Application Data

(63) Continuation of application No. 17/587,356, filed on Jan. 28, 2022, now Pat. No. 11,792,366.

(51) Int. Cl.
*H04N 7/15* (2006.01)
*H04L 65/401* (2022.01)
*H04L 65/65* (2022.01)
*H04N 7/14* (2006.01)

(52) U.S. Cl.
CPC ........... *H04N 7/152* (2013.01); *H04L 65/401* (2022.05); *H04L 65/65* (2022.05); *H04N 7/147* (2013.01)

(58) Field of Classification Search
CPC . H04L 45/00; H04L 45/02; H04L 45/24–243; H04L 65/00; H04L 65/1066; H04L 65/1083; H04L 65/1093; H04L 65/1095; H04L 65/1101; H04L 65/40–401; H04L 65/403; H04L 69/00; H04L 69/14; H04L 69/18; H04N 7/00; H04N 7/14–147; H04N 7/15–152

See application file for complete search history.

(56) References Cited

U.S. PATENT DOCUMENTS

| | | | | |
|---|---|---|---|---|
| 6,785,229 B1* | 8/2004 | McNiff | ................... | H04L 43/16 370/230 |
| 7,925,270 B1* | 4/2011 | Johnson | ................ | H04W 72/02 455/562.1 |
| 10,798,612 B2* | 10/2020 | Kurz | ..................... | H04W 48/16 |
| 11,140,457 B1* | 10/2021 | Jordan | ............. | H04N 21/64707 |
| 11,792,366 B2* | 10/2023 | Roper | ..................... | H04L 65/80 |
| 2008/0013480 A1* | 1/2008 | Kapoor | ..................... | H04L 5/14 370/328 |
| 2010/0291966 A1* | 11/2010 | Hu | ........................ | H04L 5/0044 455/552.1 |
| 2018/0054746 A1* | 2/2018 | Balachandran | ....... | H04W 76/27 |
| 2018/0262419 A1* | 9/2018 | Ludin | ..................... | H04L 45/24 |
| 2018/0331944 A1* | 11/2018 | Salkintzis | ............... | H04L 45/24 |
| 2019/0166605 A1* | 5/2019 | Yang | ..................... | H04W 72/21 |

(Continued)

Primary Examiner — Boris D Grijalva Lobos
(74) Attorney, Agent, or Firm — Kilpatrick Townsend & Stockton LLP

(57) ABSTRACT

One example method bridging video conference connections includes joining, using a client device, a video conference using a first network interface, the video conference including a plurality of participants; determining a need for a second network interface; connecting to the video conference using the second network interface simultaneously with the first network interface; assigning a first multimedia stream to the first network interface and a second multimedia stream to the second network interface; and using the first and second network interfaces to transmit or receive the first and second multimedia streams.

20 Claims, 7 Drawing Sheets

(56) References Cited

U.S. PATENT DOCUMENTS

2019/0245810 A1* 8/2019 Gulbay ................ H04L 49/602
2020/0288085 A1* 9/2020 Yang ..................... H04N 7/152
2021/0203884 A1* 7/2021 You ...................... H04M 3/567

* cited by examiner

BRIDGING VIDEO CONFERENCE CONNECTIONS

CROSS-REFERENCE

This application is a continuation of U.S. patent application Ser. No. 17/587,356, filed Jan. 28, 2022, titled "Bridging Video Conference Connections," the entirety of which is hereby incorporated by reference.

FIELD

This application generally relates to video conferencing and more particularly relates to bridging video conference connections.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
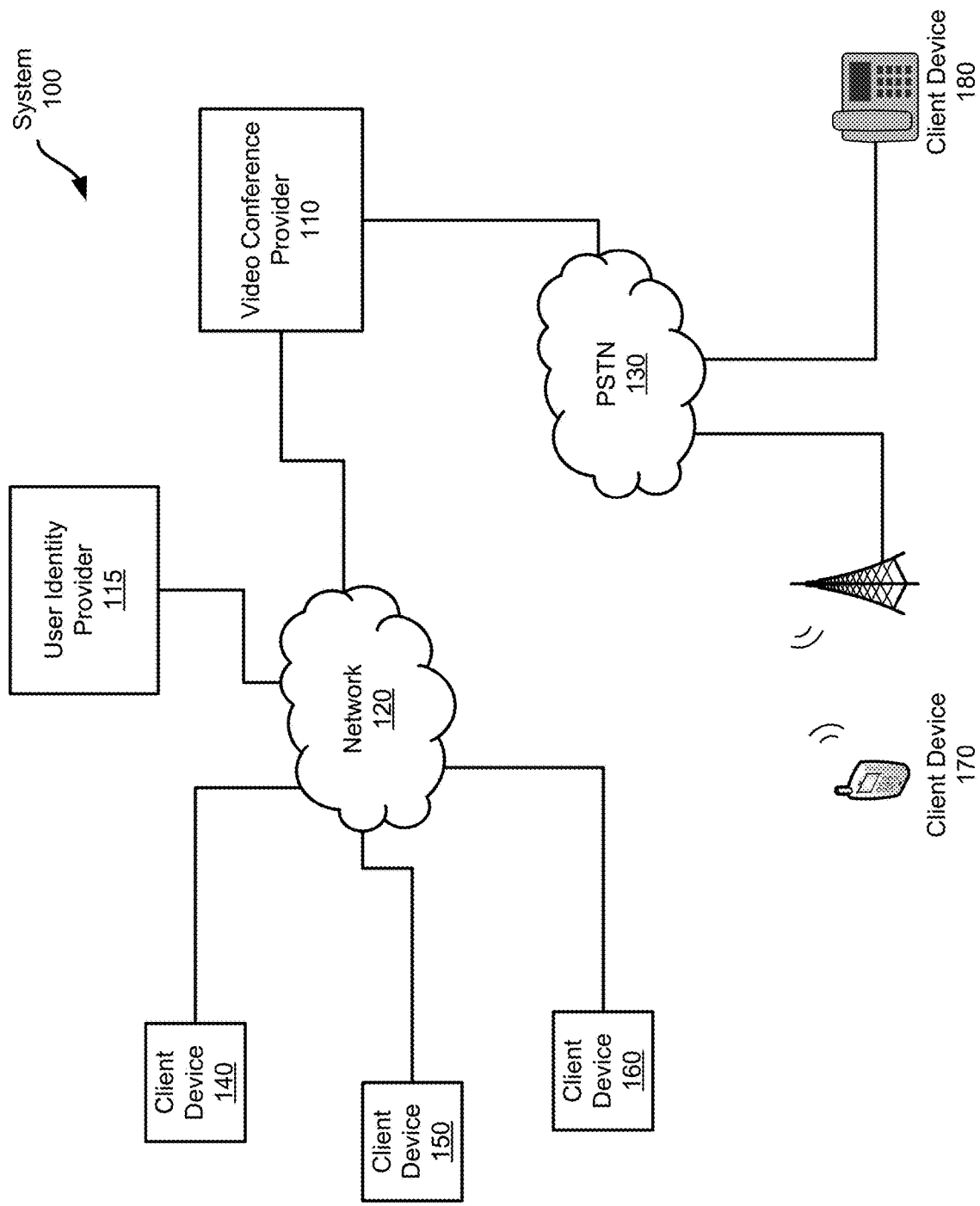
FIGS. 1-2 are example systems for bridging video conference connections.

Examples are described herein in the context of bridging video conference connections. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

People participate in video conferences for a wide variety of reasons, such as to keep in touch with family, conduct business, or manage groups or organizations. Frequently, people attend video conferences using their own personal client device, such as a desktop or laptop computer, tablet, or smartphone. However, as a result, they may join video conferences from locations with slow or unreliable network connections, which can impact the quality of audio or video streams transmitted by their client device to the video conference provider and other participants in the video conference.

To help mitigate the effects of such connectivity issues, it may be possible to access a second network connection using a different device and employ both network connections to provide audio and video streams to the video conference provider. For example, if person uses their laptop or tablet to execute video conference client software to join a video conference using their home's internet connection, e.g., via WiFi, the video conference client software may monitor the quality of the WiFi connection and, if the connection quality drops below a threshold quality for more than a preset period of time, the video conference client software may establish a connection to the user's smartphone, such as by using Bluetooth, and employ the smartphone's cellular data connection as a secondary network connection over which audio or video streams can be transmitted.

Once the secondary network connection is established, the video conference client software may monitor both network connections and determine a highest quality connection. It may then select one of the audio or video streams to be routed over the highest quality connection to ensure the other participants in the video conference are able to receive the best quality audio or video from the user, while allowing some degradation of the other stream by routing it to the lower-quality connection. For example, the video conference client software may route the user's audio stream over the highest quality network connection to ensure the other participants can clearly hear the user, even if the video stream is degraded or unavailable. Alternatively, if the secondary network connection has sufficient bandwidth, the video conference client software may temporarily route both audio and video streams over the secondary network connection until the primary network connection returns to an acceptable quality level. Thus, during the video conference, the video conference client software may dynamically shift the audio and video streams between the two network connections.

Once the video conference has ended, the video conference client software disconnects the client device from the user's smartphone to terminate the secondary network connection. Thus, the process to enable and disable alternative network connections may be entirely transparent to the user.

Such techniques may allow a user to participate in a video conference even in scenarios where a network connection is unreliable, slow, or otherwise of poor quality, but without requiring the user to send all video conferencing data over a more expensive network connection, such as a cellular data connection. Further, because the video conference client software may manage the different connections and dynamically route data across different connections during the video conference, the user may be unaware of the changes, and the re-routing may occur much more quickly than if the user were to perform the re-routing manually or than if they were to drop from the video conference entirely to switch to the more expensive network connection before rejoining the video conference.

To provide such functionality as well as other functionality described herein, an example method for bridging video conference connections may include joining, using a client device, a video conference using a first network interface, the video conference including a plurality of participants; determining to use a second network interface; connecting to the video conference using the second network interface simultaneously with the first network interface; assigning a first multimedia stream to the first network interface and a second multimedia stream to the second network interface; and using the first and second network interfaces to transmit or receive the first and second multimedia streams.

In addition, a system for bridging video conference connections may include a first network interface; a non-transitory computer-readable medium; and one or more processors communicatively coupled to the first network interface and the non-transitory computer-readable medium, the one or more processors configured to execute processor-executable instructions stored in the non-transitory computer-readable medium to cause the one or more processors to join a video conference using a first network interface, the video conference including a plurality of participants; determine to use a second network interface; connect to the video conference using the second network interface simultaneously with the first network interface; assign a first multimedia stream to the first network interface and a second multimedia stream to the second network interface; and use the first and second network interfaces to transmit or receive the first and second multimedia streams.

Further, one example non-transitory computer-readable medium includes processor-executable instructions configured to cause one or more processors to join a video conference using a first network interface, the video conference including a plurality of participants; determine to use a second network interface; connect to the video conference using the second network interface simultaneously with the first network interface; assign a first multimedia stream to the first network interface and a second multimedia stream to the second network interface; and use the first and second network interfaces to transmit or receive the first and second multimedia streams.

These illustrative examples are given to introduce the reader to the general subject matter discussed herein and the disclosure is not limited to these examples. The following sections describe various additional non-limiting examples and examples of bridging video conference connections.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
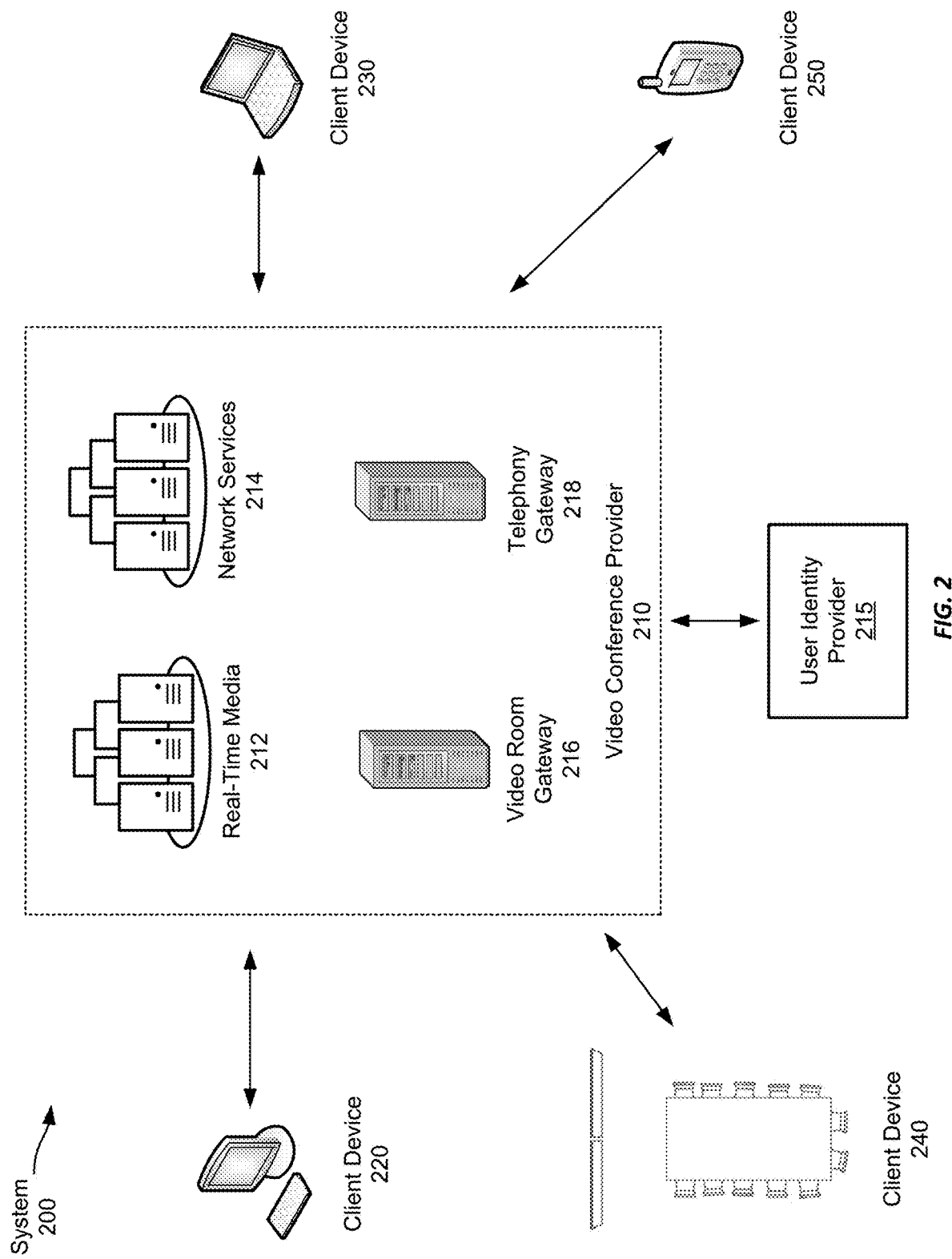

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O) as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
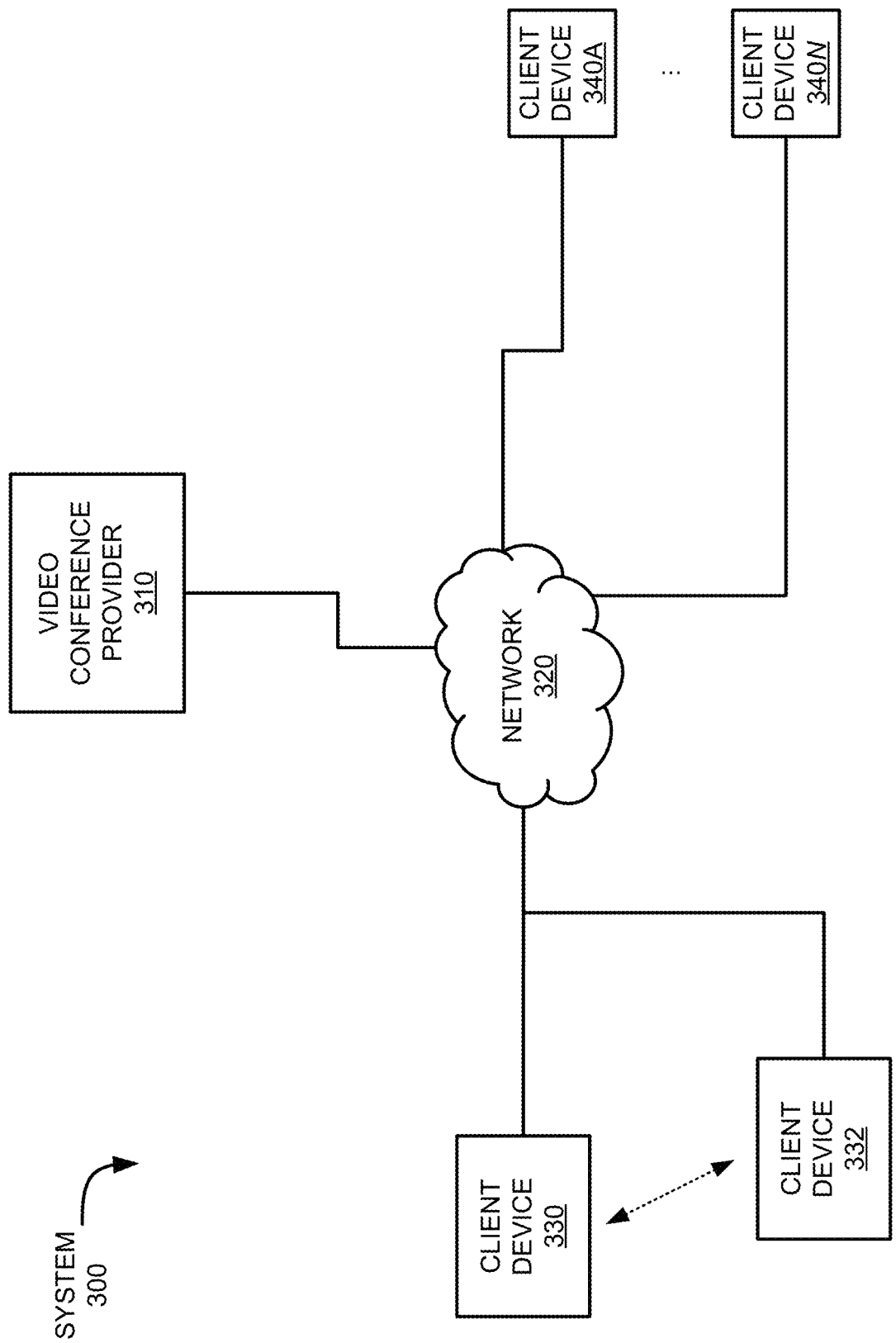
FIGS. 3A-3B show example systems for bridging video conference connections.
Figure 3B:
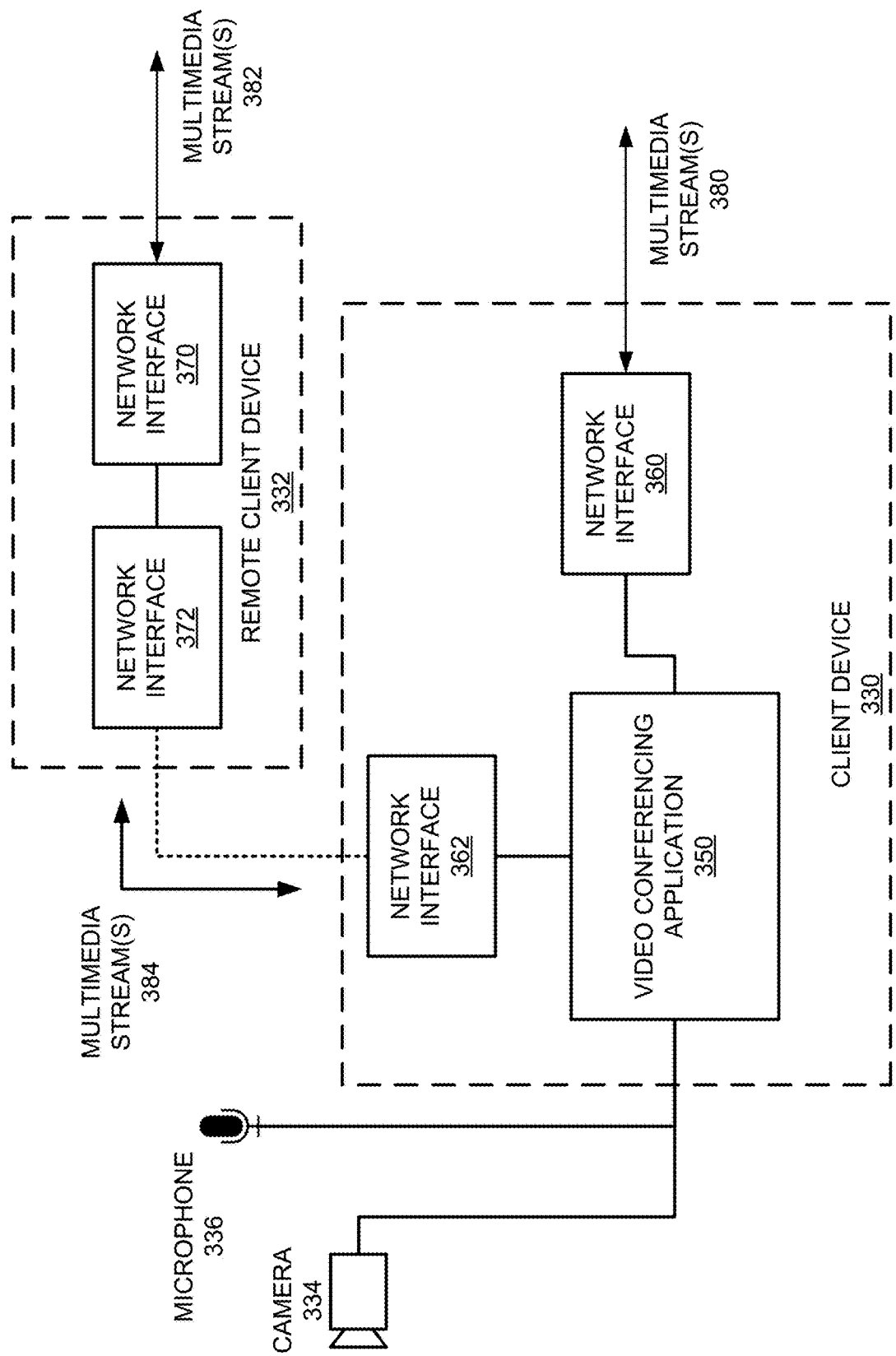

Referring now to FIGS. 3A-3B, FIG. 3A shows an example system for bridging video conference connections. This example system 300 includes two client devices 330 operated by one user that are connected to one or more communications networks 320, such as the internet. The system 300 also includes a video conference provider 310 and multiple other client device 340a-n that are also connected to the one or more communications networks 320.

In operation, a user may use a software client executed by client device 330 to join or host a video conference using the video conference provider 310, generally as described above with respect to FIGS. 1 and 2. During the video conference, the client device 330 sends and receives multimedia streams, such as audio or video streams, to the video conference provider 310, which in turn provides them to the other participants in the video conference.

During the video conference, the software client monitors the state of the network connection to the video conference provider 310, such as the available bandwidth, congestion, packet loss, latency, or jitter, to determine whether the network connection is of sufficiently high quality to allow high quality transfer of multimedia streams. For example, the software client may receive video images from a camera that are encoded and transmitted as a video stream to the video conference provider 310. Based on the quality of the network connection, the software client may select from multiple available video encoders or select options within a particular video encoder to generate a video stream having a bit rate that can be reliably communicated across the network connection.

For example, if the network connection has a bandwidth of tens or hundreds of kilobits per second, it may select a low-bit-rate video encoder to generate video at a lower resolution, e.g., 640×480 pixels, having a bit rate of tens or hundreds of kilobits per second. In contrast, if the network connection has a reliable bandwidth in the megabits per second, the software client may select a video encoder that provides a higher-bit-rate encoding, such as high-definition ("HD") video (e.g., 1920×1080 pixels). Further, if the network connection is of low quality, the software client may also employ a compression scheme (e.g., a lossy compression scheme) to further reduce bandwidth requirements, potentially at the cost of video quality.

While such strategies may enable participants to continue providing video streams even when network conditions are suboptimal, the user's perceived immersion in the video conference may be negatively impacted due to the lower resolution video or video artifacts resulting from compression. In addition, similar strategies may be employed for the audio streams, potentially resulting in reduced audio quality. To help alleviate the impact of poor network conditions, the software client may connect the client device 330 to a remote client device 332 to make use of a network connection available to the remote client device's connection to the network 320 in addition to the local client device's network connection. It can then use both network connections to send or receive multimedia streams.

Referring now to FIG. 3B, the client device executes a software client, referred to as the video conferencing application 350 in this example. The video conferencing application 350 receives audio and video data from a microphone 336 and a camera 334, respectively, connected to the client device 330. During a video conference, the video conferencing application 350 encodes the received audio and video data and transmits them to the network as multimedia streams 380 using a network interface 360. The video conferencing application 350 also monitors the state of the network connection between the network interface 360 and the video conference provider 310. As discussed above, the state of the network connection can include many different factors, such as available bandwidth, network congestion, latency, jitter, packet loss, quality of service ("QoS") prioritization schemes, wireless signal strength, interference, or other characteristic. If the video conferencing application 350 determines that current network conditions are too poor to provide sufficiently high-quality video or audio streams, it can connect the client device 330 to a remote client device 332 to make use of the remote client device's network connection.

In this example, both the client device 330 and the remote client device 332 include two network interfaces 360-362, 372-370. The client device 360 uses one network interface 360 to connect to the network 320 and the other network interface 362 to connect to the remote client device 332. Similarly, the remote client device 332 can use network interface 372 to connect to the client device 330, and network interface 370 to connect to the network 320. Any suitable network interfaces 360-362, 370-372 may be employed. In this example, network interface 360 is a WiFi interface that connects to a WiFi access point at the user's location. Network interfaces 362 and 372 are Bluetooth ("BT") interfaces, while network interface 370 is a wireless cellular network interface. However, other suitable interfaces may be employed. For example, network interfaces 360, 370 may be WiFi, wired ethernet, or any suitable network interface for a local area network ("LAN"), corporate network, wide area network ("WAN"), or metro area network ("MAN"). Similarly, the network interfaces 362, 372 may be any suitable wired or wireless network interface to enable device-to-device communications. Such interfaces 362, 372 may be peer-to-peer interfaces, such as BT, BT low energy ("BLE"), Universal Serial Bus ("USB"), FireWire, Thunderbolt, or Lightning® interfaces provided by Apple®. In some examples, however, the network interface 362, 372 may enable device-to-device connections via one or more intervening networks, e.g., a LAN via a WiFi or ethernet connection. Thus, network interfaces 362, 372 may be any suitable network interfaces that may be employed to establish device-to-device communications between the client device 330 and the remote client device 332.

In the scenario discussed above where the client device 330 determines the network conditions are too poor to provide sufficiently high-quality video or audio streams, it can connect to the remote client deice 332 to make use of its cellular network interface. To employ the remote client device's cellular network interface 370, the client device 330 establishes a BT connection with the remote client device 332 and issues one or more instructions to the remote client device 332 to connect to the video conference using its cellular network interface 370. The client device 330 then routes one or more multimedia streams to the remote client device 332, which transmits them as multimedia stream(s) 382.

To allow such functionality to happen in this example, the remote client device 332 has previously been configured to allow the client device 330 to pair with it via BT. Further, it has been configured to launch a software application, e.g., another copy of the video conferencing application 350, to communicate with the video conferencing application 350 executing on the client device 330 to coordinate the communication of audio or video streams both between the client device 330 and the remote client device 332 as well as between the remote client device 332 and the video conference provider 310. For example, the client device 330 may instruct the remote client device to receive and transmit a video stream to the video conference provider 310, while the client device 330 may continue to transmit an audio stream using its network interface 360 to the video conference provider 310.

During the course of the video conference, the client device 330 and remote client device 332 may exchange multimedia streams 384, which may be relayed to the video conference provider 310 from the client device 330, or from the video conference provider 310 to the client device 330. Further, as network conditions change during the course of the video conference, the video conferencing application 350 may dynamically re-route one or more multimedia streams to the remote client device 332 or back to the client device 330. This can result in all multimedia streams being routed through the remote client device 332 or the client device 330.

Further, in some examples, the video conferencing application 350 may further allocate upstream and downstream multimedia streams between the devices. In the context of this application "upstream" refers to communications sent from the client device 330 to the video conference (whether from the video conference provider or directly from another participant device), while "downstream" refers to communications received by the client device 330 from the video conference.

For example, to ensure the other participants in the video conference receive the best quality experience, the client device 330 may route upstream audio from the client device 330 to the remote client device 332, while using its own network interface to route upstream video as well as receive audio and video streams from the video conference provider. Thus, it may dedicate the bandwidth for the remote client device to transmitting audio streams of the highest quality, at the cost of potentially degrading the user's own experience by receiving lower-quality audio and video from the video conference provider. Thus, the video conferencing application 350 may independently route any or all upstream or downstream multimedia streams to the remote client device 332, or return them to the client device 330, depending on network conditions.

Figure 4:
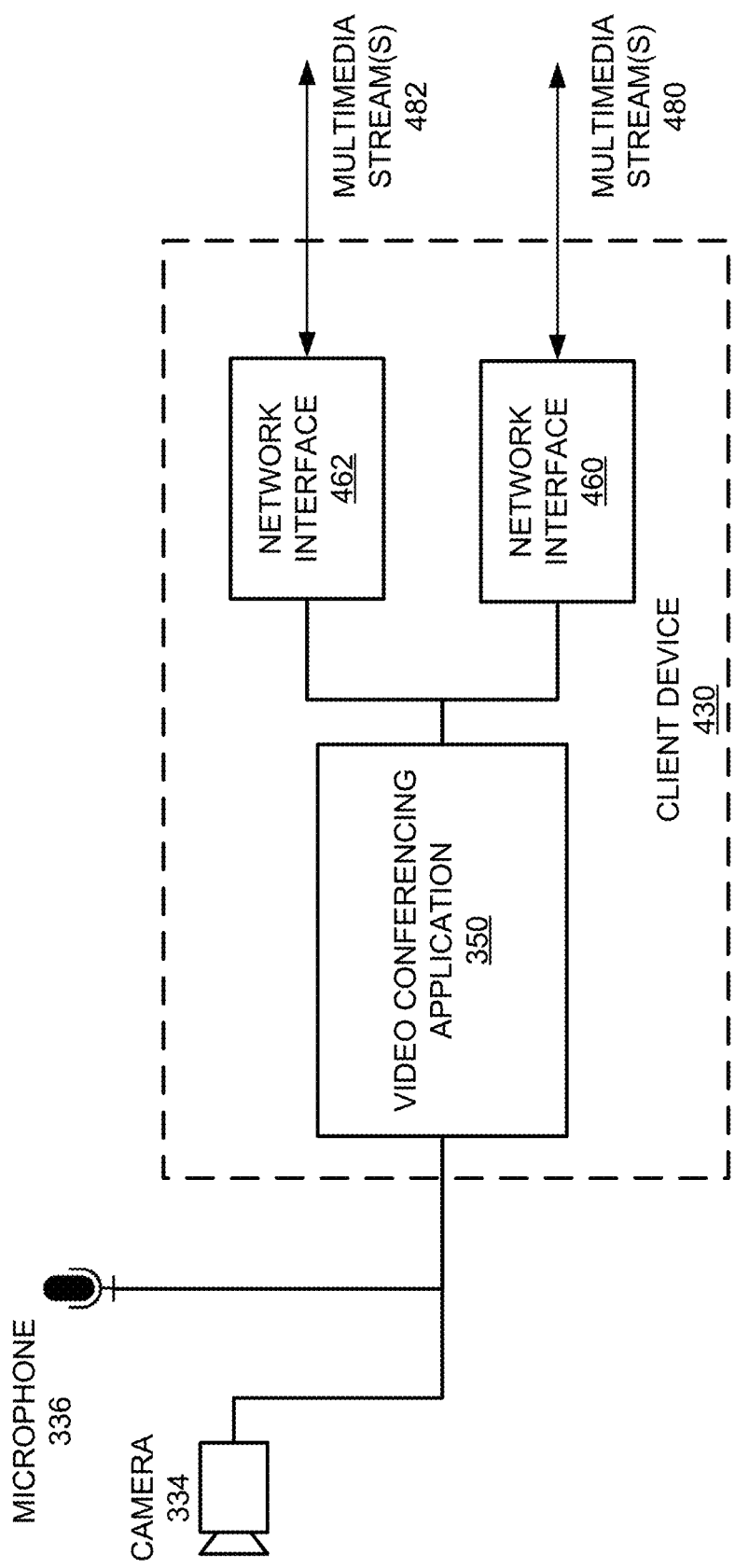
FIG. 4 shows an example system for bridging video conference connections.

Referring now to FIG. 4, FIG. 4 shows an example system for bridging video conference connections. In this example, a client device 430 includes two different network interfaces 460, 462 that can be used to connect to different communications networks to enable a user to participate in a video conference. As discussed above with respect to FIGS. 3A-3B, a user may employ their client device 430 to join and participate in a video conference. To do so, the client device 430 executes a video conferencing application 350 that uses a network connection provided by one of the network interfaces 460, 462 to connect to the video conference provider, generally as discussed above with respect to FIGS. 1-2.

During the video conference, the video conferencing application 350 monitors the quality of the network connection, as discussed above with respect to FIGS. 3A-3B. If the quality of the network connection becomes too degraded, the video conferencing application 350 can attempt to activate a second network interface to obtain a different network connection to the video conference provider. However, unlike with respect to the examples discussed above with respect to FIGS. 3A-3B, in this example, the client device 430 does not connect to a remote client device. Instead, the client device 430 activates a second network interface to obtain a different network connection.

For example, the client device 430 may initially join the video conference using a WiFi connection provided by network interface 460 and use the network connection to send and receive multimedia streams 480. During the video conference, the video conferencing application may determine that the network connection provided by the network interface 460 is of low quality and that one or more multimedia streams should be sent using a different network connection. The video conferencing application 350 can then activate a new network connection (or access a previously activated network connection) using network interface 462, such as via a cellular network. Once the video conferencing application 350 has activated or accessed the additional network connection, it can select one or more multimedia streams to route through the network connection provided by the additional network interface 462, generally as discussed above with respect to FIGS. 3A-3B.

Figure 5:
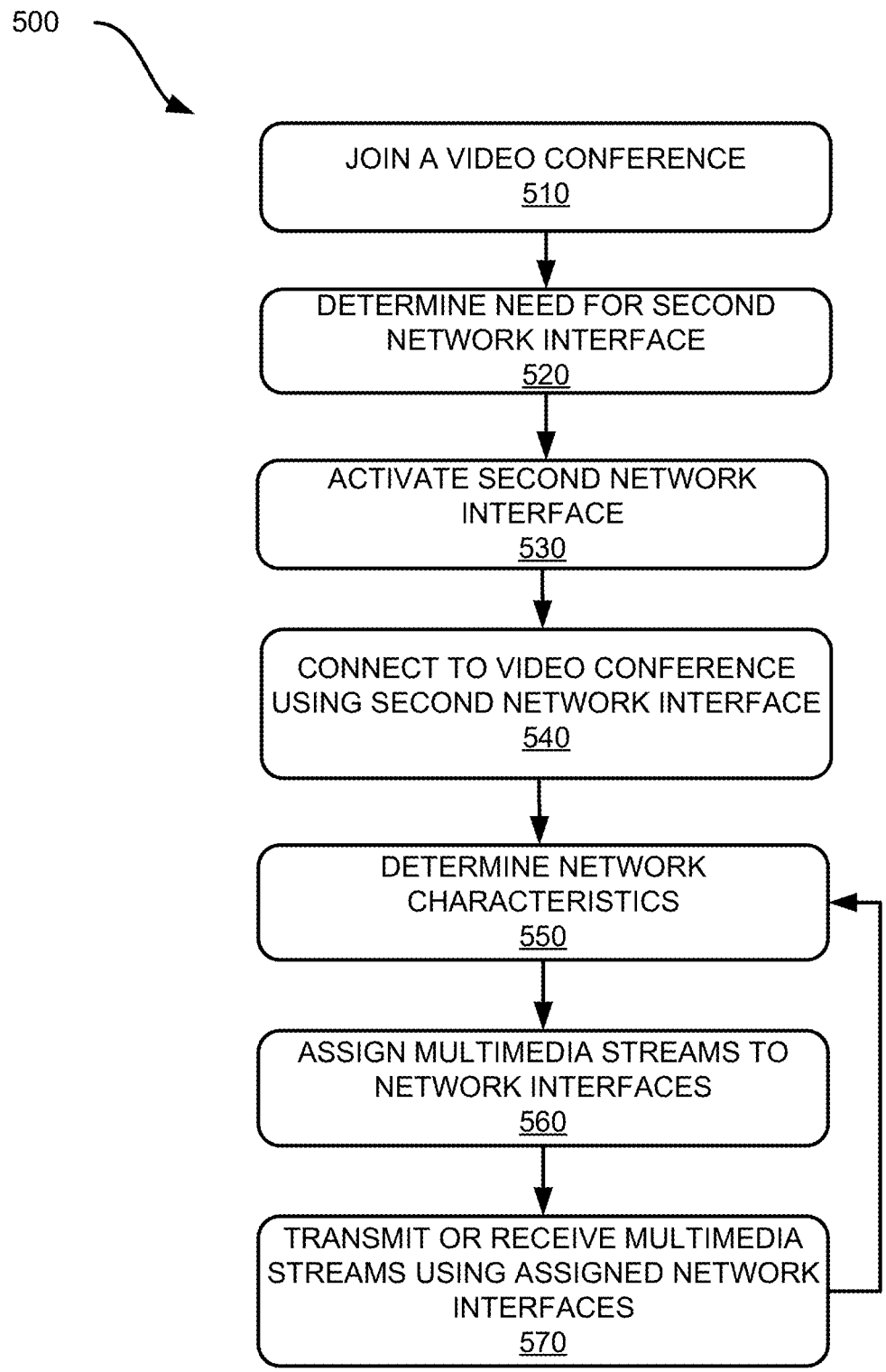
FIG. 5 shows an example method for bridging video conference connections.

Referring now to FIG. 5, FIG. 5 shows an example method 500 for bridging video conference connections. The example method 500 shown in FIG. 5 will be described with respect to the example system 300 shown in FIGS. 3A-3B; however, it should be appreciated that any suitable system according to this disclosure may be employed, such as the system 400 shown in FIG. 4.

At block 510, a user uses a video conferencing application 350 executed by their client device 330 to join a video conference hosted by a video conference provider 310, generally as discussed above with respect to FIGS. 1-3B.

At block 520, the video conferencing application 350 determines to use a second network interface. As discussed above, the video conferencing application 350 may monitor a state of a network connection to the video conference provider 310. To determine whether to use an additional network interface, the video conferencing application 350 may determine information about the state of the network connection, such as those characteristics discussed above with respect to FIGS. 3A-3B. In addition, the video conferencing application may determine one or more of a number or types of multimedia streams being transmitted or received by the video conferencing application 350, bit rates associated with the one or more multimedia streams, different available encoders/decoders for the multimedia streams, or priority information for one or more of the multimedia streams.

The video conferencing application 350 may then determine whether the network connection can provide a threshold amount of upstream or downstream bandwidth, a threshold latency, a threshold jitter, or a threshold number of lost packets per period of time. It may also determine whether the network exhibits characteristics of a threshold level of congestion, whether the network interface indicates a threshold signal strength from a wireless access point (e.g., a WiFi access point or cellular network) or other network characteristic threshold.

Based on which thresholds or characteristics are satisfied according to different implementations or different weightings of those thresholds, the video conferencing application 350 may determine that a need exists for a second network interface. For example, the video conferencing application 350 may determine that the network connection has dropped approximately 10% of upstream packets over the past 30 seconds, which exceeds a predetermined threshold of 2.5% per rolling 30-second interval. The video conferencing application 350 may then determine that because too many packets are being dropped, an additional network connection is needed. In another example, the video conferencing application 350 may determine that the available bandwidth from the network interface 360 has dropped, e.g., due to other network traffic, below a threshold that would require a lower quality video encoder to be used. For example, 1080p high-definition ("HD") video may require approximately 3.8 megabits per second (Mbps) of network bandwidth, while 720p HD video may only require 2.6 Mbps. If the available upstream bandwidth changes from 5 Mbps to 3 Mbps, the video conferencing application 350 may switch from the 1080p encoder to a 720p encoder to temporarily accommodate the reduced bandwidth but determine that a second network interface is needed to return to full 1080p video encoding.

At block 530, the video conferencing application 350 activates a second network interface. As discussed above with respect to FIGS. 3A-3B, the video conferencing application 350 may cause the client device 330 to establish a connection with a remote client device 332 to make use of the remote client device's network interface 370. The video conferencing application 350 may cause the client device 330 to use a wireless network interface, e.g., network interface 362, to establish a peer-to-peer connection to the remote client device 332 and transmit one or more messages to access a second network interface 370 provided by the remote client device 332. To do so, the one or more messages may cause the remote client device to launch a video conferencing application that can access the network interface 370. Similarly, the two devices 330, 332 may be connected by wired connection, e.g., a USB cable, and the video conferencing application 350 may transmit messages via the USB connection.

In some examples, the video conferencing application 350 may activate a second network interface by sending one or more commands to a remote client device 332 to change or enable an operating mode. For example, if the remote client device 332 has cellular communication capabilities and WiFi capabilities, the video conferencing application 350 may send one or more commands to the remote client device 332 to configure itself to operate in a hotspot mode, whereby the remote client device 332 shares its connection to a network, whether wired or wireless, via a separate communications interface, whether wired or wireless. For a cellular device operating as a remote client device 332, this may cause the remote client device 332 to activate its WiFi radio, or to operate its WiFi radio in a mode to allow other devices to connect to it via WiFi. It can then share its cellular network connection with the devices connected to it via WiFi. Such an approach may allow the client device 330 to connect to the remote client device 332 via WiFi and employ its cellular communication capabilities. And while this example employs WiFi to provide the connection between the client device 330 and the remote client device 332, the remote client device 332 may provide hotspot functionality through a wired connection, such as a USB or Lightning® connection, that is then allowed to make use of the cellular communication capabilities.

At block 540, the video conferencing application 350 connects to the video conference using the second network interface 370. In this example, the video conferencing application 350 sends one or more messages to a video conferencing application executed by the remote client device 350, which in turn connects to the video conference using the user's own access information and identifies the connection as a second connection for the user. The video conference provider 310 may allow the remote client device to connect to the video conference but treat the two connections as belonging to a single participant, rather than two participants.

In some examples, rather than executing a copy of a video conferencing application on the remote client device 332, the remote client device 332 may present the second network connection 370 for access by the video conferencing application 350 on the client device 330, such as in a cellular wireless hotspot configuration. The video conferencing application 350 may then be able to directly send and receive multimedia streams using the second network connection 370 without interacting with another video conferencing application on the remote client device 332. The video conferencing application 350 may then establish a second connection to the video conference using the second network interface 370, as discussed above.

At block 550, the video conferencing application 350 may determine network characteristics of the two network connections, generally as discussed above with respect to FIGS. 3A-3B. Such characteristics may include available upstream and downstream bandwidth, latency, jitter, packet loss, wireless signal strength, congestion, availability of QOS schemes, wireless interference etc.

At block 560, the video conferencing application 350 assigns multimedia streams to the two network interfaces 360, 370. As discussed above, multimedia streams may be assigned independently in the upstream and downstream directions. Further, audio and video streams in one or both directions may be allocated independently of each other. Such allocations may be made based on network characteristics of the two network connections, or independently of those network characteristics. For example, the video conferencing application may assign video streams to the remote client device 332 and audio streams to the client device 330 without considering the network characteristics of one or both network connections.

In some examples, it may assign multimedia streams to the network connections based on a priority associated with the multimedia streams. For example, upstream audio may be assigned a highest priority, followed by upstream video of the participant, followed by upstream video of presented content, followed by downstream audio streams, and finally followed by downstream video streams. However, any suitable prioritization scheme may be employed.

At block 570, the video conference application 350 transmits and receives multimedia streams using the two network interfaces, such as by transmitting one or more multimedia streams to the remote client device 332.

The method 500 may then return to block 550 to continue to monitor the network connections and determine corresponding network characteristics. Thus, the client device 330 may continuously monitor the available network connections and dynamically re-assign multimedia streams throughout the duration of the video conference, as appropriate.

It should be appreciated that while the discussion above employed a remote client device 332 to provide the second network connection, the second network connection may be provided by a different network interface on the client device 330, such as illustrated in FIG. 4, without employing a remote client device 332.

While the examples above describe the use of two network connections, possibly provided by two different computing devices, there is not a limit on the number of network connections that may be employed. For example, any number of network connections may be employed, depending on the available networking resources.

Figure 6:
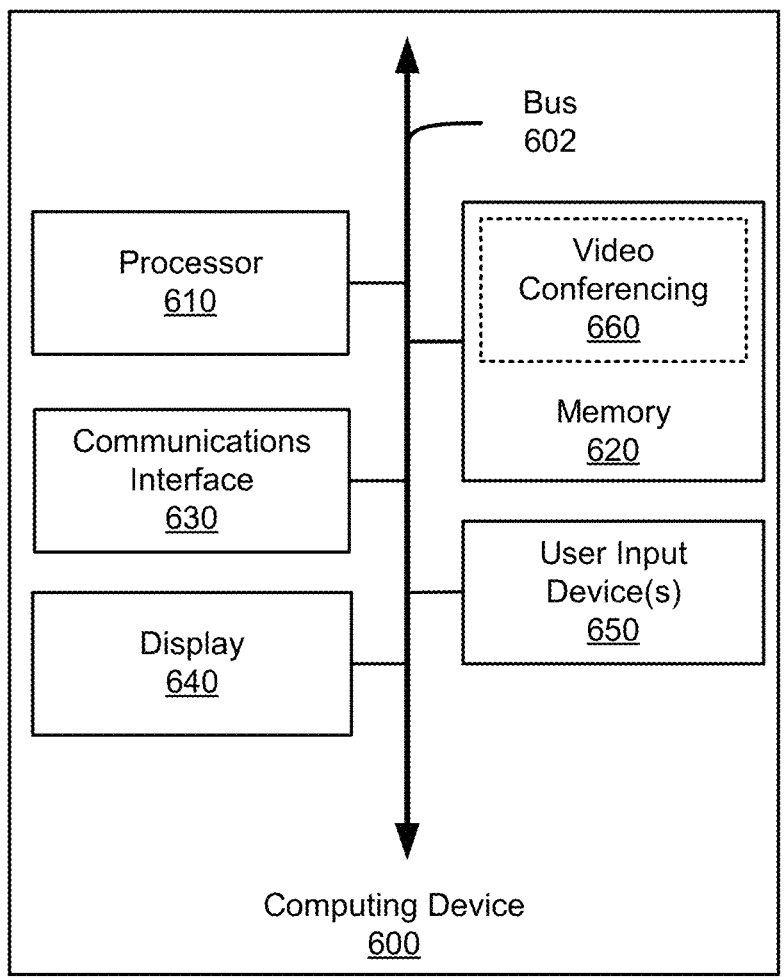
FIG. 6 shows an example computing device suitable for use with systems and methods for bridging video conference connections.

Referring now to FIG. 6, FIG. 6 shows an example computing device 600 suitable for use in example systems or methods for bridging video conference connections according to this disclosure. The example computing device 600 includes a processor 610 which is in communication with the memory 620 and other components of the computing device 600 using one or more communications buses 602. The processor 610 is configured to execute processor-executable instructions stored in the memory 620 to perform one or more methods for bridging video conference connections according to different examples, such as part or all of the example method 500 described above with respect to FIG. 5. The computing device 600, in this example, also includes one or more user input devices 650, such as a keyboard, mouse, touchscreen, microphone, etc., to accept user input. The computing device 600 also includes a display 640 to provide visual output to a user.

In addition, the computing device 600 includes a video conferencing application 660 to enable a user to join and participate in a video conference, such as a conventional meeting or webinar, by receiving multimedia streams from a video conference provider, sending multimedia streams to the video conference provider, joining and leaving breakout rooms, bridge video conference connections, etc. such as described throughout this disclosure, etc.

The computing device 600 also includes a communications interface 640. In some examples, the communications interface 630 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

Multiple examples have been discussed; however, any number of examples may be employed according to this disclosure. For example, a first example includes a method that includes joining, using a client device, a video conference using a first network interface, the video conference including a plurality of participants; determining to use a second network interface; connecting to the video conference using the second network interface simultaneously with the first network interface; assigning a first multimedia stream to the first network interface and a second multimedia stream to the second network interface; and using the first and second network interfaces to transmit or receive the first and second multimedia streams.

A second example employs the method of the first example, wherein the client device comprises the second network interface, and further comprising, in response to determining to use the second network interface, activating the second network interface.

A third example employs the method of the first or second example, wherein the first network interface uses a first wireless networking protocol and the second network interface uses a second wireless networking protocol, the first wireless networking protocol different from the second wireless networking protocol.

A fourth example employs the method of any of the first to third examples, further comprising connecting, by the client device, to a remote device using a third network interface; and wherein the remote device provides the second network interface.

A fifth example employs the method of any of the first to fourth examples, further comprising determining a first network characteristic using the first network interface; determining a second network characteristic using the second network interface; and wherein assigning the first multimedia stream to the first network interface and the second multimedia stream to the second network interface is based on the first and second network characteristics.

A sixth example employs the method of any of the first to fifth examples, wherein the first multimedia stream is an uplink multimedia stream and the second multimedia stream is a downlink multimedia stream.

A seventh example employs the method of any of the first to sixth examples, further comprising determining a first connection quality using the first network interface; determining a second connection quality using the second network interface; responsive to determining that the first connection quality is a higher connection quality than the second connection quality, assigning the uplink multimedia stream to the first network interface; and assigning the downlink multimedia stream to the second network interface.

An eighth example is a system that includes a communications interface; a non-transitory computer-readable medium; and one or more processors communicatively coupled to the communications interface and the non-transitory computer-readable medium, the one or more processors configured to execute processor-executable instructions stored in the non-transitory computer-readable medium to join a video conference using a first network interface, the video conference including a plurality of participants; determine to use a second network interface; connect to the video conference using the second network interface simultaneously with the first network interface; assign a first multimedia stream to the first network interface and a second multimedia stream to the second network interface; and use the first and second network interfaces to transmit or receive the first and second multimedia streams.

A ninth example employs the system of the eighth example, further comprising the second network interface, and wherein the one or more processors are communicatively coupled to the second network interface and configured to execute further processor-executable instructions stored in the non-transitory computer-readable medium to cause the one or more processors to, in response to determining to use the second network interface, activate the second network interface.

A tenth example employs the system of the eighth or ninth examples, wherein the first network interface uses a first wireless networking protocol and the second network interface uses a second wireless networking protocol, the first wireless networking protocol different from the second wireless networking protocol.

An eleventh example employs the system of any of the eighth through tenth examples, further comprising a third network interface, wherein the one or more processors are communicatively coupled to the third network interface and configured to execute further processor-executable instructions stored in the non-transitory computer-readable medium to cause the one or more processors to connect to a remote device using the third network interface; and wherein the remote device provides the second network interface.

A twelfth example employs the system of any of the eighth through eleventh examples, wherein the one or more processors are configured to execute further processor-executable instructions stored in the non-transitory computer-readable medium to cause the one or more processors to determine a first network characteristic using the first network interface; determine a second network characteristic using the second network interface; and assign the first multimedia stream to the first network interface and the second multimedia stream to the second network interface based on the first and second network characteristics.

A thirteenth example employs the system of any of the eighth through twelfth examples, wherein the first multimedia stream is an uplink multimedia stream and the second multimedia stream is a downlink multimedia stream.

A fourteenth example employs the system of any of the eighth through thirteenth examples, wherein the first multimedia stream is an uplink multimedia stream and the second multimedia stream is a downlink multimedia stream, and wherein the one or more processors are configured to execute further processor-executable instructions stored in the non-transitory computer-readable medium to cause the one or more processors to determine a first connection quality using the first network interface; determine a second connection quality using the second network interface; responsive to a determination that the first connection quality is a higher connection quality than the second connection quality assign the uplink multimedia stream to the first network interface; and assign the downlink multimedia stream to the second network interface.

A fifteenth example is a non-transitory computer-readable medium that includes processor-executable instructions configured to cause one or more processors to join a video conference using a first network interface, the video conference including a plurality of participants; determine to use a second network interface; connect to the video conference using the second network interface simultaneously with the first network interface; assign a first multimedia stream to the first network interface and a second multimedia stream to the second network interface; and use the first and second network interfaces to transmit or receive the first and second multimedia streams.

A sixteenth example employs the non-transitory computer-readable medium of the fifteenth example, further comprising processor-executable instructions configured to cause the one or more processors to, in response to determining to use the second network interface, activate the second network interface.

A seventeenth example employs the non-transitory computer-readable medium of the fifteenth or sixteenth examples, wherein the first network interface uses a first wireless networking protocol and the second network interface uses a second wireless networking protocol, the first wireless networking protocol different from the second wireless networking protocol.

An eighteenth example employs the non-transitory computer-readable medium of any of the fifteenth through seventeenth examples, further comprising processor-executable instructions configured to cause the one or more processors to connect to a remote device using a third network interface; and wherein the remote device provides the second network interface.

A nineteenth example employs the non-transitory computer-readable medium of any of the fifteenth through eighteenth examples, further comprising processor-executable instructions configured to cause the one or more processors to determine a first network characteristic using the first network interface; determine a second network characteristic using the second network interface; and assign the first multimedia stream to the first network interface and the second multimedia stream to the second network interface based on the first and second network characteristics.

A twentieth example employs the non-transitory computer-readable medium of any of the fifteenth to nineteenth examples, wherein the first multimedia stream is an uplink multimedia stream and the second multimedia stream is a downlink multimedia stream.

A twenty-first example employs the non-transitory computer-readable medium of any of the fifteenth to twentieth examples, wherein the first multimedia stream is an uplink multimedia stream and the second multimedia stream is a downlink multimedia stream, and further comprising processor-executable instructions configured to cause the one or more processors to determine a first connection quality using the first network interface; determine a second connection quality using the second network interface; responsive to a determination that the first connection quality is a higher connection quality than the second connection quality assign the uplink multimedia stream to the first network interface; and assign the downlink multimedia stream to the second network interface.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
joining, using a first network interface of a client device, a video conference, the video conference including a plurality of participants;
after joining the video conference, connecting to the video conference using a second network interface simultaneously with the first network interface;
assigning a first multimedia stream to the first network interface and a second multimedia stream to the second network interface based on network characteristics associated with the first and second network interfaces; and
using the first and second network interfaces to transmit or receive the first and second multimedia streams, respectively, during the video conference.

2. The method of claim 1, wherein the client device comprises the second network interface, and further comprising, in response to determining to use the second network interface, activating the second network interface.

3. The method of claim 1, wherein the first network interface uses a first wireless networking protocol and the second network interface uses a second wireless networking protocol, the first wireless networking protocol different from the second wireless networking protocol.

4. The method of claim 1, further comprising:
connecting, by the client device, to a remote device using a third network interface; and
wherein the remote device provides the second network interface.

5. The method of claim 1, further comprising:
determining a first network characteristic using the first network interface;
determining a second network characteristic using the second network interface; and
assigning a first multimedia stream to the first network interface and a second multimedia stream to the second network interface based on the first and second network characteristics.

6. The method of claim 5, wherein the first multimedia stream is an uplink multimedia stream and the second multimedia stream is a downlink multimedia stream.

7. A system comprising:
a first network interface;
a non-transitory computer-readable medium; and
one or more processors communicatively coupled to the first network interface and the non-transitory computer-readable medium, the one or more processors configured to execute processor-executable instructions stored in the non-transitory computer-readable medium to cause the one or more processors to:
join, using the first network interface, a video conference, the video conference including a plurality of participants;
after joining the video conference, connect to the video conference using a second network interface simultaneously with the first network interface;
assign a first multimedia stream to the first network interface and a second multimedia stream to the second network interface based on network characteristics associated with the first and second network interfaces; and
use the first and second network interfaces to transmit or receive the first and second multimedia streams, respectively, during the video conference.

8. The system of claim 7, further comprising the second network interface, and wherein the one or more processors are communicatively coupled to the second network interface and configured to execute further processor-executable instructions stored in the non-transitory computer-readable medium to cause the one or more processors to, in response to determining to use the second network interface, activate the second network interface.

9. The system of claim 7, wherein the first network interface comprises a WiFi interface and the second network interface comprises a Bluetooth interface.

10. The system of claim 7, wherein the first network interface comprises a first WiFi interface and the second network interface comprises a second WiFi interface.

11. The system of claim 7, wherein the one or more processors are configured to execute further processor-executable instructions stored in the non-transitory computer-readable medium to cause the one or more processors to:
determine a first network characteristic using the first network interface;
determine a second network characteristic using the second network interface; and
assign a first multimedia stream to the first network interface and a second multimedia stream to the second network interface based on the first and second network characteristics.

12. The system of claim 7, wherein a first multimedia stream is an uplink multimedia stream and a second multimedia stream is a downlink multimedia stream, and wherein the one or more processors are configured to execute further processor-executable instructions stored in the non-transitory computer-readable medium to cause the one or more processors to:
determine a first connection quality using the first network interface;
determine a second connection quality using the second network interface;
responsive to a determination that the first connection quality is a higher connection quality than the second connection quality:
assign the uplink multimedia stream to the first network interface; and
assign the downlink multimedia stream to the second network interface.

13. A non-transitory computer-readable medium comprising processor-executable instructions configured to cause one or more processors to:
- join, using a first network interface, a video conference, the video conference including a plurality of participants;
- after joining the video conference, connect to the video conference using a second network interface simultaneously with the first network interface;
- assign a first multimedia stream to the first network interface and a second multimedia stream to the second network interface based on network characteristics associated with the first and second network interfaces; and
- use the first and second network interfaces to transmit or receive the first and second multimedia streams, respectively, during the video conference.

14. The non-transitory computer-readable medium of claim 13, further comprising processor-executable instructions configured to cause the one or more processors to, in response to determining to use the second network interface, activate the second network interface.

15. The non-transitory computer-readable medium of claim 13, wherein the first network interface uses a first wireless networking protocol and the second network interface uses a second wireless networking protocol, the first wireless networking protocol different from the second wireless networking protocol.

16. The non-transitory computer-readable medium of claim 13, further comprising processor-executable instructions configured to cause the one or more processors to:
- connect to a remote device using a third network interface; and
- wherein the remote device provides the second network interface.

17. The non-transitory computer-readable medium of claim 13, further comprising processor-executable instructions configured to cause the one or more processors to:
- determine a first network characteristic using the first network interface;
- determine a second network characteristic using the second network interface; and
- assign a first multimedia stream to the first network interface and a second multimedia stream to the second network interface based on the first and second network characteristics.

18. The non-transitory computer-readable medium of claim 17, wherein the first multimedia stream is an uplink multimedia stream and the second multimedia stream is a downlink multimedia stream.

19. The non-transitory computer-readable medium of claim 13, wherein a first multimedia stream is an uplink multimedia stream and a second multimedia stream is a downlink multimedia stream, and further comprising processor-executable instructions configured to cause the one or more processors to:
- determine a first connection quality using the first network interface;
- determine a second connection quality using the second network interface;
- responsive to a determination that the first connection quality is a higher connection quality than the second connection quality:
  - assign the uplink multimedia stream to the first network interface; and
  - assign the downlink multimedia stream to the second network interface.

20. The non-transitory computer-readable medium of claim 13, wherein a first multimedia stream is an audio multimedia stream and a second multimedia stream is a video multimedia stream, and further comprising processor-executable instructions configured to cause the one or more processors to:
- determine a first connection quality using the first network interface;
- determine a second connection quality using the second network interface;
- responsive to a determination that the first connection quality is a higher connection quality than the second connection quality:
  - assign the audio multimedia stream to the first network interface; and
  - assign the video multimedia stream to the second network interface.

* * * * *